(12) United States Patent
van den Berg

(10) Patent No.: US 6,167,838 B1
(45) Date of Patent: Jan. 2, 2001

(54) METHOD AND AN IMPLEMENT FOR AUTOMATICALLY MILKING ANIMALS

(75) Inventor: Karel van den Berg, Bleskensgraaf (NL)

(73) Assignee: Maasland N.V.(NL)

( * ) Notice: Under 35 U.S.C. 154(b), the term of this patent shall be extended for 0 days.

(21) Appl. No.: 09/302,481

(22) Filed: Apr. 30, 1999

(30) Foreign Application Priority Data

May 1, 1998 (NL) .................................................... 1009052

(51) Int. Cl.$^7$ ...................................................... A01J 5/01
(52) U.S. Cl. ..................................... 119/14.02; 119/14.08
(58) Field of Search ............................. 119/14.02, 14.08, 119/14.14, 14.15, 14.18, 14.38

(56) References Cited

U.S. PATENT DOCUMENTS

| | | | | |
|---|---|---|---|---|
| 4,440,110 | * | 4/1984 | Hicks ................................. | 119/14.08 |
| 5,218,924 | * | 6/1993 | Thompson et al. ................ | 119/14.02 |
| 5,568,788 | * | 10/1996 | Van Den Berg et al. .......... | 119/14.02 |
| 5,704,311 | * | 1/1998 | Van Den Berg .................... | 119/14.02 |
| 6,073,579 | * | 6/2000 | Innings et al. ..................... | 119/14.02 |

* cited by examiner

Primary Examiner—Peter M. Poon
Assistant Examiner—Elizabeth Shaw
(74) Attorney, Agent, or Firm—Penrose Lucas Albright

(57) ABSTRACT

An apparatus for automatically milking animals wherein teat cups are applied to the animals' teats by an automated robot, each teat cup comprising a shell and liner composed of flexible elastic material wherein the liner has an opening at its top to receive an animal's teat and in its lower aspect discharges milk in pulses to a milk conduit connected to a container for receiving and sharing the milk. Each teat cup includes a sensor for continually measuring instantaneous magnitudes of milk being received from the teat and a pulsator which controls the duration of contractions by the liner. The milking operation comprises a foremilking stage, a main milking stage and a stripping stage, the durations of which, as such, and durations of individual pulsations in each stage are electronically controlled based on data received from the sensor. The durations and levels of milk suction and release during each stage and each individual pulse cycles of each stage are controlled, such control being based on a predetermined reduction in the instantaneous magnitude of the milk flow during each pulse cycle and the milking stage involved.

30 Claims, 1 Drawing Sheet

METHOD AND AN IMPLEMENT FOR AUTOMATICALLY MILKING ANIMALS

FIELD OF THE INVENTION

The invention relates to a method of automatically milking animals, and more particularly to controlling the pulsating vacuum to which the teat is subjected during milking.

BACKGROUND OF THE INVENTION

In known prior art methods the pulsating vacuum under the teat is controlled on the basis of the milk flow from the relevant teat. See: U.S. Pat. No. 3,754,532 of Aug. 28, 1973 to Troberg et al and U.S. Pat. No. 4,011,838 of Mar. 15, 1977 to Nordstrom et al; and International Application Publication Nos. WO 95/31096 of Nov. 23, 1996 to Ornerfors et al, and WO 96/36213 of Nov. 21, 1996 to Innings et al.

An object of the instant invention is to provide an improvement of the aforementioned known methods.

SUMMARY OF THE INVENTION

In accordance with the invention the improvement over the prior art methods is achieved in that the method disclosed herein comprises the following steps:

measuring repeatedly or continuously a quantity which is a measure for the momentary pulse milk flow, (by pulse milk flow is meant the milk flow from a teat during a single suction phase of the milking process);

controlling the duration or the level or both of milk vacuum present under the teat during the actual suction phase on the basis of the measured quantity, (by suction phase is meant the time during which the teat is exposed to a vacuum during the above-mentioned pulse milk flow).

The above mentioned method has the advantage of preventing the teat from being exposed for a too long period of time to the milk vacuum when the momentary pulse milk flow decreases.

According to an inventive feature, the vacuum level of the milk vacuum is lowered or reduced or secured when a decrease in the pulse milk flow is detected. In this manner teat or udder damage or both are avoided. According to a further inventive feature, the method comprises the following steps:

storage during the actual suction phase, of the maximum value of the pulse milk flow measured thus far or the or quantity or magnitude related thereto, lowering or reducing or securing the vacuum level of the milk vacuum as soon as the momentary value of the pulse milk flow or the quantity or magnitude related thereto reduces below a specific, preferably adjustable threshold value.

According to again another inventive feature, the method comprises the following steps:

storage, during the actual suction phase, of the maximum value of the pulse milk flow measured thus far or the quantity related thereto, squeezing or contracting the liner of the teat cup as soon as the momentary value of the pulse milk flow or the quantity or magnitude related thereto is below a specific, preferably adjustable threshold value.

According to an inventive feature, the threshold value is between 60% and 80% of the maximum value of the pulse milk flow measured thus far or the quantity or magnitude related thereto. In a preferred embodiment of the invention said value, amounts to approximately 70%. According to again another aspect of the invention, for the purpose of avoiding teat or udder damage or both, the duration of the suction phase is limited to a value between 0.8 and 2 seconds and preferably is approximately 1.4 seconds. According to an inventive feature, the time during which the teat is hardly exposed, if at all, to the vacuum during milking, i.e. the release phase, amounts to between 30% and 40% and preferably to approximately 35% of the duration of the suction phase.

In accordance with an aspect of the invention, the maximum duration of the release phase during the main milking stage is between 175 and 225 milliseconds and preferably is 200 milliseconds. According to again another inventive feature, the maximum duration of the release phase during foremilking is between 30 and 100 milliseconds and preferably is 40 milliseconds. According to an inventive feature, the maximum duration of the release phase during stripping amounts to between 225 and 800 milliseconds and preferably is 400 milliseconds.

According to again another inventive feature, the abovementioned method is applied to each teat individually, so that the teat or udder damage or both due to the milking operation is minimized.

The invention also relates to an apparatus for automatically milking animals, said apparatus comprising at least one adjustable pulsator and at least one pulse milk flow sensor, wherein the above described methods can be applied by the apparatus. According to an aspect of the invention, the pulse milk flow sensor comprises a conductivity sensor. According to again another inventive feature, the pulse milk flow sensor may also be constituted by an optical or acoustical sensor or a sensor which is both optically and acoustically sensitive. In a particular embodiment of the invention the sensor is constituted by a small microphone. In order to obtain an optimal control of the pulsator, according to a further inventive feature, the pulse milk flow sensor is disposed in the teat cup or in the milk line system at a place located as closely as possible to the teat. Therefore, according to an inventive feature, the pulse milk flow sensor is disposed in the teat cup. In a preferred embodiment of the invention the pulse milk flow sensor is arranged in the pulse chamber, i.e. the space between the liner and the outer casing of the teat cup. According to again another embodiment of the invention, the pulse milk flow sensor is disposed in or on a part of a milk line of the teat cup that is closest to the teat cup.

In accordance with again another inventive feature, the apparatus comprises a milking robot for automatically connecting the teat cups to the teats of an animal to be milked.

BRIEF DESCRIPTION OF THE DRAWINGS

The invention will now be explained in further detail with reference to the accompanying drawings, in which.

DETAILED DESCRIPTION OF THE PREFERRED EMBODIMENTS

Figure 1:
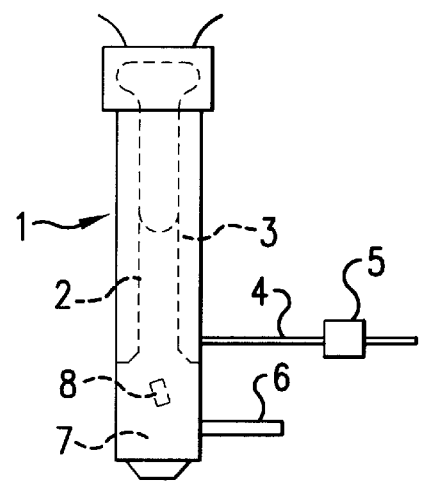
FIG. 1 is a side elevational view of a teat cup in which a pulse milk flow sensor is disposed.

FIG. 1 shows a teat cup 1 provided with a liner 2 and a pulse chamber 3. A pulse tube 4 is connected to pulse chamber 3. A computer-controlled adjustable pulsator 5 is included in the pulse tube. A milk line 6 is arranged near the lower side of teat cup 1. In the lower part of teat cup 1 a pulse milk flow sensor 8 is disposed in a milk collecting chamber 7. Pulse milk flow sensor 8 is connected to a computer or calculation unit. In the present embodiment the pulse milk flow sensor comprises a microphone. With the aid of the computer or calculation unit or both, computer-controlled adjustable pulsator 5 can be controlled on the basis of the signal supplied by pulse milk flow sensor 8. The control of pulsator 5 will now be explained in further detail with reference to the diagrams of FIG. 2.

Figure 2:
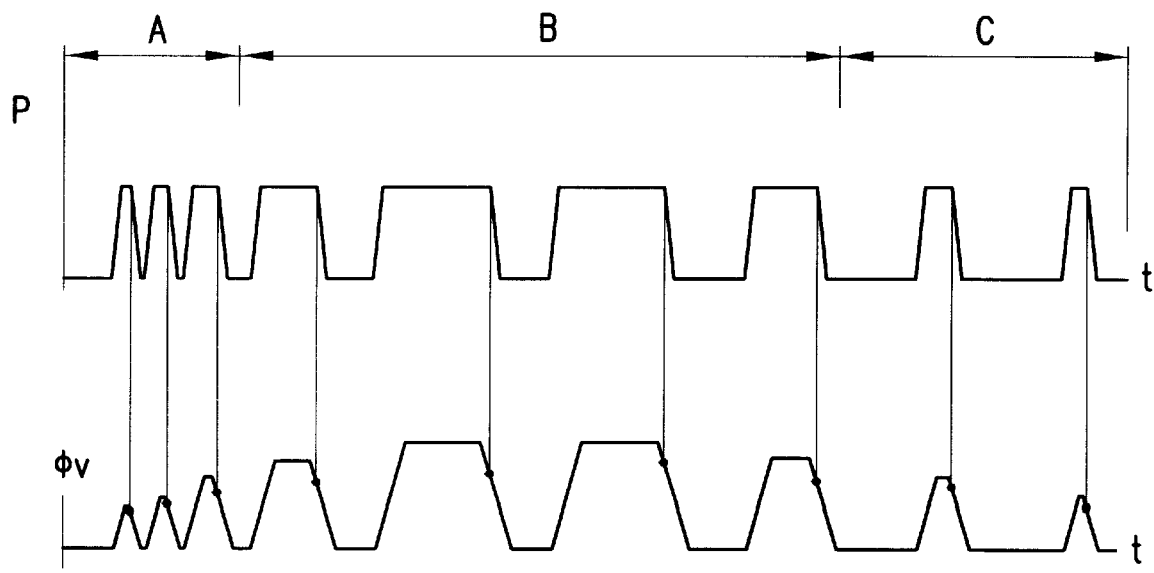
FIG. 2 shows the pulsation curve and the corresponding pulse milk flow curve.

The upper undulating line (under the delineations defined by arrows and labeled A, B or C) of FIG. 2 shows schematically the pulsation variations of the pulsator for one teat. The horizontal X-axis is the time axis and the vertical Y-axis represents the vacuum level of the milk vacuum. The lower undulating line represents the momentary pulse milk flow, the X-axis again being the time axis with the Y-axis representing the volume flow of milk from a teat. As indicated in FIG. 2, milking can be subdivided into three stages, i.e.:

A) The foremilking stage during which the relevant udder quarter is stimulated to secrete milk;

B) The main milking stage during which the udder quarter easily secretes milk; and C) The stripping stage during which the "remaining milk" is milked from the udder quarter.

As already mentioned before, the present invention avoids the condition wherein a vacuum continues for a too long period of time under the teat when the milk flow from the relevant udder quarter has ceased. With the aid of the pulse milk flow sensor it is possible continuously to detect changes in the pulse milk flow (FIG. 2). In the lower part of FIG. 2 the vertical lines indicate at what points in the various consecutive pulse milk flows the measured quantity thereof deviates by a specific percentage from the maximum value of that quantity measured thus far. In the present embodiment said value amounts to 70% of the maximum value of the pulse milk flow measured thus far. As shown by the upper line, at that moment the pulsator is activated by means of the computer in such a manner that the milk vacuum level under the teat is reduced. By so lowering the milk vacuum the milk remaining in the particular pulse flow is received from the relevant udder quarter without the teat remaining exposed to the maximum vacuum. In this manner teat or udder damage or both are avoided. As shown in FIG. 2, this phase is followed by a so-called release phase during which proper blood circulation in the teat may take place. As shown in FIG. 2, during foremilking the frequency of the pulsator is relatively high in relation to the main milking and stripping stages. This high pulsation stimulates the relevant udder to secrete milk.

Although I have disclosed the preferred embodiments of my invention, it is to be understood that it is capable of other adaptations and modifications within the scope of the following claims.

Having disclosed my invention, what I claim as new and to be secured by Letters Patent of the United States of America is:

1. A method of automatically milking animals, comprising the following steps:
   A. Continually measuring a magnitude which is a measure for the momentary pulse milk flow during a single suction phase of the milking process; and
   B. Modulating the vacuum under the teat during the actual suction phase on the basis of said measured magnitude, said actual suction phase being the time during which the teat is exposed to a vacuum during the said pulse milk flow.

2. A method in accordance with claim 1, wherein the level of said vacuum is reduced when a decrease in the pulse milk flow is manifested by a measurement of said magnitude.

3. A method in accordance with claim 1 which includes the step of electronically storing during said actual suction phase the maximum magnitude of said pulse milk flow, the vacuum under the teat during said actual suction phase being thereafter modulated when the measured magnitude of said pulse milk flow is reduced from said maximum magnitude to a predetermined lesser magnitude.

4. A method in accordance with claim 3 which includes the additional step of contracting the liner of a teat cup which receives said teat when said predetermined lesser magnitude is detected.

5. A method in accordance with claim 3 wherein said lesser magnitude is between about 60% and about 80% of said maximum magnitude.

6. A method in accordance with claim 3 wherein said lesser magnitude is approximately 70% of said maximum magnitude.

7. A method as claimed in claim 1 wherein the duration of said single suction phase is between 0.8 and 2 seconds.

8. A method in accordance with claim 1 wherein the duration of said single suction phase is approximately 1.4 seconds.

9. A method in accordance with claim 1 wherein the vacuum under the teat during the main milking stage when the udder quarter of said teat easily secretes milk comprises alternating suction phases and release phases, said release phases being between about 30% and about 40% of the duration of said main milking stage.

10. A method in accordance with claim 9 wherein said release phases are approximately 35% of the duration of said main milking stage.

11. A method in accordance with claim 10 wherein the maximum duration of each said release phase of said main milking stage is between about 175 and about 225 milliseconds.

12. A method in accordance with claim 9 wherein the average duration of said release phases of said main milking stage is approximately 200 milliseconds.

13. A method in accordance with claim 1 which comprises a foremilking stage which comprises a plurality of alternating suction phases and release phases, the duration of each of said release phases being between about 30 and about 100 milliseconds.

14. A method in accordance with claim 1 comprising a foremilking stage which includes a plurality of alternating suction phases and release phases, the durations of said release phases each averaging approximately 40 milliseconds.

15. A method in accordance with claim 1 which comprises a stripping stage which comprises a plurality of alternating suction phases and release phases, the duration of each said release phase being between about 225 and about 800 milliseconds.

16. A method in accordance with claim 1 comprising a stripping stage which comprises a plurality of alternating suction phases and release phases, said release phases averaging a duration of approximately 400 milliseconds.

17. A method in accordance with claim 1 which comprises individually applying the steps of the method to each teat of the animal being milked.

18. A method of automatically milking animals in three stages, each said stage comprising a plurality of alternating suction phases and release stages, continually measuring instantaneously magnitudes of pulse milk flow during said suction phases and modulating the vacuum applied to the teats of the animal being milked so that the vacuum applied to said teats is reduced during each release phase in response to a predetermined reduction in the measured instantaneous magnitude of the pulse milk flow during the corresponding suction phase.

19. A method in accordance with claim 18 wherein the vacuum applied to said teats is substantially secured during each of said release phases.

20. A method in accordance with claim 18 wherein the vacuum applied to said teats during said release phases is substantially reduced relative to the vacuum applied to said teats during the corresponding suction phases of said plurality of suction phases and release phases.

21. A apparatus for automatically milking animals which includes a milking robot and teat cups, said milking robot automatically connecting said teat cups to the animal being milked, each said teat cup comprising a shell which receives a liner composed of a flexible elastic material, each said liner having an opening at its upper aspect for receiving the teat of the animal being milked and a discharge tube at its lower aspect which has a milk flow connection to a milk conduit by means of which milk received from the teat of an animal being milked is discharged from said teat cup to a container for receiving such milk, a pulse milk flow sensor associated with each said teat cup which continually provides instantaneous pulse milk flow magnitudes of milk received by the associated said teat cup in pulses from the teat received in such teat cup, and modulating means for modulating the vacuum applied to said teat in response to a predetermined instantaneous magnitude of milk flow in a pulse of milk received from said teat as detected by the associated said pulse milk flow sensor, and an adjustable pulsator for adjusting the duration of the contraction of said liner in response to said predetermined instantaneous magnitude detected by the associated said pulse milk flow sensor.

22. An apparatus in accordance with claim 21 wherein each of said teat cups is associated with its own adjustable pulsator and pulse milk flow sensor.

23. An apparatus in accordance with claim 21 wherein said pulse milk flow sensor comprises a conductivity sensor.

24. An apparatus in accordance with claim 21 wherein said pulse milk flow sensor comprises an optical sensor.

25. An apparatus in accordance with claim 21 wherein said pulse milk flow sensor comprises an acoustical sensor.

26. An apparatus in accordance with claim 21 wherein said pulse milk flow sensor comprises a combined optical and acoustical sensor.

27. An apparatus in accordance with claim 21 wherein said pulse milk flow sensor is disposed in said teat cup.

28. An apparatus in accordance with claim 21 wherein said pulse milk flow sensor is disposed proximate the teat of the animal being milked which is received in said teat cup.

29. An apparatus in accordance with claim 28 wherein said pulse milk flow sensor is disposed on said liner of said teat cup.

30. An apparatus in accordance with claim 21 wherein said pulse milk flow sensor is disposed in said milk line conduit at a location proximate said teat cup.

\* \* \* \* \*